Dec. 7, 1948.  A. B. MICHALENKO  2,455,598
CLAMP
Filed July 12, 1947

ANDREW B. MICHALENKO,
INVENTOR.

BY W. A. Beatty

ATTORNEY.

Patented Dec. 7, 1948

2,455,598

UNITED STATES PATENT OFFICE 2,455,598

CLAMP

Andrew B. Michalenko, Los Angeles, Calif.

Application July 12, 1947, Serial No. 760,624

2 Claims. (Cl. 248—74)

The invention relates to a clamp for supporting electrical wires or tubing.

An object of the invention is to provide a clamp which is universal in the sense that the clamp has bolt apertures in directions mutually at right angles to each other whereby the bolt which fastens the clamp on a suitable support may extend through one aperture parallel to the axis of the clamp, or through the other aperture at right angles to the axis of the clamp. Such clamps are known, but in one form of such clamp two bolts are required, one to hold the ends of the clamp together, and the other to fasten the clamp to a support. In another known clamp, the ends of the clamp are held together by a hook and notch arrangement, with only one bolt aperture for a bolt extending crosswise of the axis of the clamp. Both of these known bolts have the disadvantage that they are not adapted to support wires or tubing extending over the edge of a partition or support and they are not adapted to serve as a grommet to protect the wires or tubing from the edge of an aperture through the support.

According to the invention, the clamp is provided with a tongue which is offset from one edge of the clamp whereby the edge which projects beyond the tongue can rest on and be supported by an edge of a partition, or it can project through a hole in a partition to serve as a grommet.

According to a further feature of the invention, one form of clamp is provided wherein a single bolt holds the ends of the clamp together and serves to fasten the clamp to a suitable support, the single bolt serving these functions for either one of two sets of bolt holes in the clamp, one of these sets being parallel to the axis of the clamp and the other hole being crosswise thereof.

In another form of the invention, a single bolt may be used in either one of two bolt holes which are at right angles to each other, the ends of the clamp being secured together not by that bolt, but by a hook and notch arrangement.

The clamp is preferably lined with rubber as well known.

For further details of the invention, reference may be made to the drawings wherein Fig. 1 is a perspective view of a preferred form of the invention, showing the clamp closed.

Figure 1:
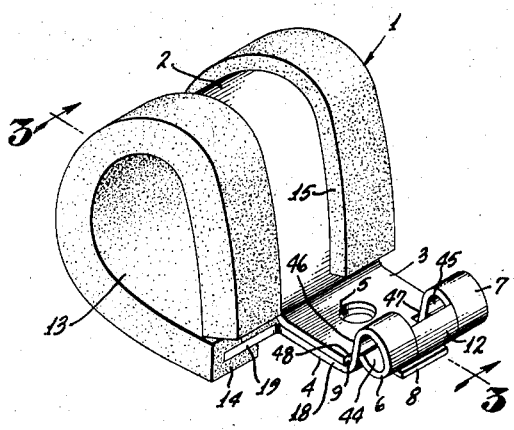

Referring in detail to the drawings, the clamp 1 comprises a strip of sheet metal having a hollow body portion 2 which is of cylindrical or other shape to form an enclosure. By pressing against the spring action of the body 2, the ends 3 and 4 of the strip can be brought flat together or face to face. The ends 3, 4 are provided with a bolt hole 5 having an axis which extends crosswise of the axis of the body portion 2. The terminal portion of end 4 is bent to form two cylindrical ears 6 and 7 which serve as holes for a bolt extending substantially parallel to the axis of the body 2. The ears 6 and 7 are spaced apart by reason of cutting or stamping out a portion between them, while the intermediate portion of the end 4 extends in a tongue 8 substantially in the plane of the end 4.

Figure 2:
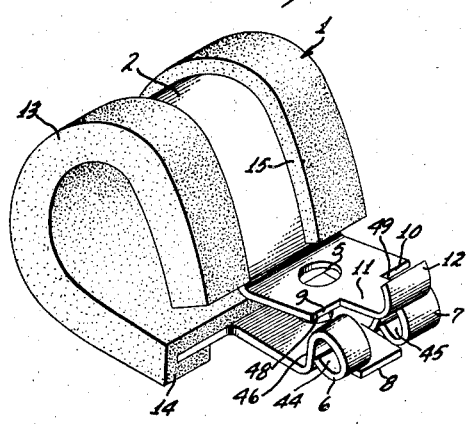
Fig. 2 is a perspective view of the clamp of Fig. 1, with the clamp open.
Figure 3:
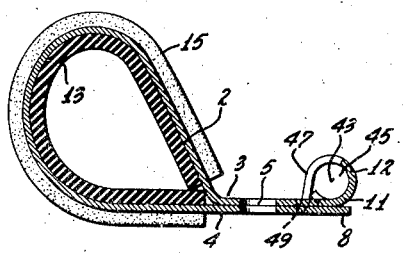
Fig. 3 is a sectional view on line 3—3 of Fig. 1, looking in the direction of the arrows.

The end 3 is cut away at the front corners as indicated at 9 and 10 so that the clamp ends 3 and 4 will fit together without striking the ears 6, 7. The intermediate portion of the end 3 has a tongue 11 movable into or out of the space between ears 6 and 7, as the clamp 1 is opened and closed. The outer end of tongue 11 is cylindrical as indicated at 12 to provide a hook, and when the clamp 1 is closed as shown in tongue 11, the hook 12 conforms to and extends side by side with the cylindrical shape of ears 6 and 7. As the body 2 is made of metal, such as aluminum, having some spring tendency, the tendency of the clamp 1 is to move to open position as shown in Fig. 2. The clamp 1 is held closed and also, is secured to a suitable support, by a bolt passing through aperture 5, or by a bolt passing through ears 6 and 7 and over the tongue 11. In the latter event, the hook 12 faces body 2 and prevents the end 3 from shifting inwardly with respect to the end 4, while the end 3 cannot shift outwardly for the following reason. The axis 43, see Fig. 3, of the ears 6 and 7 is parallel to the axis of the body 2 and is offset towards the end 3 by an amount equal to the radius of the aligned bolt holes 44, 45 plus the metal thickness of end 3, whereby the ears 6, 7 at their inner ends 46, 47 cross the shoulders 48, 49 respectively resulting from the cut outs 9, 10. The ear portions 46, 47 thus form abutments for outward movement of shoulders 48, 49 respectively. The axis of hook 12 is coaxial with ear axis 43, with ends 3 and 4 also tongues 8 and 11 in face to face relation when the clamp is held closed by a bolt through holes 44, 45 and overlying tongue 11 and the inner portion of hook 12. The hook 12 thus forms a segment, and the holes 44, 45 form another segment of the segmental hole for the bolt.

As shown in Figs. 1 and 2, the body 2 may be encased in a rubber sleeve 13 which covers the interior of the clamp as well as extending over its edges as indicated at 14 and 15.

Figure 4:
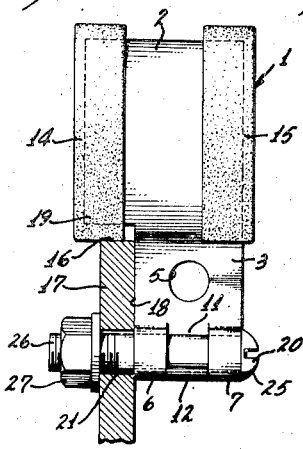
Fig. 4 is a side view in elevation showing the clamp of Fig. 1 mounted on the edge of a support shown in section.
Figure 5:
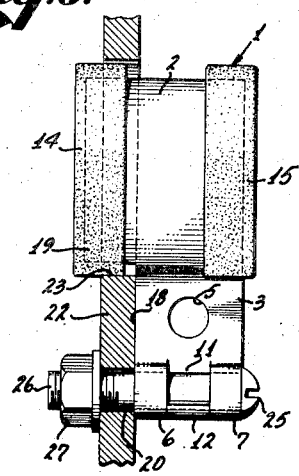
Fig. 5 is a side view in elevation of the clamp of Fig. 1 used as a grommet for a support shown in section.

In order that the clamp 1 may be employed to guard the edge 16 of a partition or support 17, the ends 3 and 4 are laterally offset from the body 2 (or body 2 is axially offset from ends 3, 4), whereby the left edge of the clamp 1, as shown in Fig. 1, overhangs the left edge 18 of the ends 3 and 4 to provide an axial overhang 19. As shown in Fig. 4, the clamp 1 is held together by a bolt 20 which passes through the ears 6 and 7 and over the tongue 11, through an aperture 21 in the support, with the edge 18 of the ends 3 and 4 against the face of the support 17 and with the overhang 19 extending over and beyond the support, whereby wires or tubing not shown held in the clamp are guarded against the edge of the support 17. The hole 21 in the support should, of course, be located a proper distance from the top of the support so that the overhang 19 will extend over and guard the edge 16 of support, and in this case, the edge 16 of the support 17 also serves as a support for the clamp 1 as the overhang 19 rests on it and is supported by it. Bolt 20 has a head 25 which bears against the ear 7, and a threaded shank 26 which extends through the hole 21 and provided with a nut 27. In a similar manner, the clamp 1 may serve as a grommet as shown in Fig. 5, wherein the support 22 is provided with a hole 23 through which the overhang 19 extends to guard the edge of the hole when the edge 18 of the ends 3 and 4 is held against the face of the support by the bolt 20. Bolt 20 is fastened to the support 22 and to the clamp 1 as previously described in connection with Fig. 4. The overhang 19 fits in hole 23 which supports the body 2.

If the wires or tubing are to extend along the support, the bolt 20 is inserted in the hole 5. In either case, the bolt 20 holds the clamp 1 together and also fastens it to the support.

Figure 6:
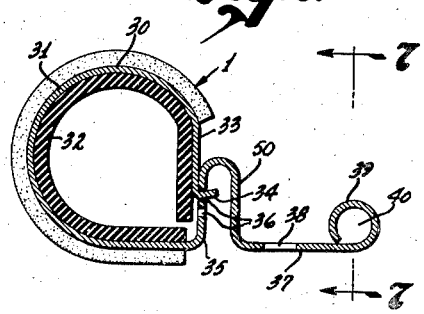
Fig. 6 is a transverse sectional view of a modification.

In the modification shown in Fig. 6, the clamp has a metal strip 30 having a body portion 31 bent substantially in the shape of a cylinder and provided with a rubber covering 32 as described above. One end 33 of the strip 30 has a hook 34 and the other end has an intermediate portion 35 having a series of apertures 36 to be engaged by the hook 34 to lock the clamp 1 closed and of an adjustable size, this hook feature being well known. Beyond the portion 35, the clamp has a reverse bend 50 which extends outwardly as a flat portion 37 having a bolt hole 38 for a bolt extending crosswise of the axis of the clamp. The portion 37 is terminated in a cylindrical portion 39 to provide a hole 40 for a bolt extending parallel to the axis of the clamp. In this case also, the terminal portion 37, 39 is offset axially with respect to the length of the body 30 whereby the left end 41 overhangs or projects beyond the left edge 42 of the clamp end 37, 39.

Figure 7:
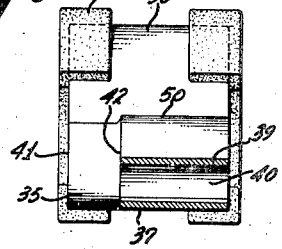
Fig. 7 is a sectional view on line 7—7 of Fig. 6, looking in the direction of the arrows.

The clamp of Figs. 6 and 7 may be mounted in position as shown in Figs. 4 and 5, with a bolt extending through the hole 40 and with the edge 42 engaging the face of the support, whereby the overhang 41 may either extend over the edge of a partition as in Fig. 4, or through and beyond the hole in a partition to serve as a grommet as in Fig. 5.

If the wire or tubing are to be supported parallel to the face of the support, the bolt is employed in the hole 5 of the clamp of Fig. 1, or in the hole 38 of the clamp of Fig. 6.

Various modifications may be made in the invention without departing from the spirit of the following claims. For example, in both forms of clamps the overhang may be omitted, whereby the left edge of the body of the clamp in Fig. 4 or Fig. 7 will be in line with the left edge of the ends of the clamp, as shown at the right edge thereof. However, the overhang is preferred, as it does not interfere with using the clamp in the ordinary way with the bolt through the hole 5 or 38. Also, the body may have an overhang wherein the body itself is not extended, but the rubber sleeve is extended to provide the overhang.

I claim:

1. A clamp having a hollow body adapted to receive wires, tubing or the like, said body having a bolt receiving end, said body having an overhang extending axially beyond one edge of said end, and means for securing said edge of said end against a support with said overhang overlying and supported by the edge of said support.

2. A clamp having a hollow body having an axis, said clamp having end portions fitting face to face and having a bolt hole extending crosswise of said axis, said end portions having bolt receiving members fitting side by side when said clamp is closed and providing a bolt hole parallel to said axis.

ANDREW B. MICHALENKO.

REFERENCES CITED

The following references are of record in the file of this patent:

UNITED STATES PATENTS

| Number | Name | Date |
|---|---|---|
| 934,804 | Folger | Sept. 21, 1909 |
| 2,340,713 | Tinnerman | Feb. 1, 1944 |